(12) United States Patent
Hashimoto (10) Patent No.: US 11,999,131 B2
(45) Date of Patent: Jun. 4, 2024

(54) ROLL-BONDED LAMINATE AND METHOD FOR PRODUCING THE SAME

(71) Applicant: TOYO KOHAN CO., LTD., Tokyo (JP)

(72) Inventor: Yusuke Hashimoto, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 18 days.

(21) Appl. No.: 16/977,672

(22) PCT Filed: Mar. 12, 2019

(86) PCT No.: PCT/JP2019/010002
§ 371 (c)(1),
(2) Date: Sep. 2, 2020

(87) PCT Pub. No.: WO2019/176937
PCT Pub. Date: Sep. 19, 2019

(65) Prior Publication Data
US 2020/0391479 A1   Dec. 17, 2020

(30) Foreign Application Priority Data

Mar. 14, 2018 (JP) .................................. 2018-047241
Jun. 26, 2018 (JP) .................................. 2018-120889

(51) Int. Cl.
*B32B 15/01* (2006.01)
*B21B 1/22* (2006.01)
(Continued)

(52) U.S. Cl.
CPC ................ *B32B 15/01* (2013.01); *B21B 1/22* (2013.01); *B21D 39/031* (2013.01); *B23K 20/04* (2013.01);
(Continued)

(58) Field of Classification Search
CPC ........ B32B 15/01; B32B 15/04; B32B 15/013; B32B 15/015; B32B 15/018;
(Continued)

(56) References Cited

U.S. PATENT DOCUMENTS 6,454,878 B1    9/2002  Achari et al.
7,101,455 B1 *  9/2006  Hase ...................... B32B 37/26
                                                              156/247

(Continued)

FOREIGN PATENT DOCUMENTS

JP         55-70490 A    5/1980
JP       2000-117319 A   4/2000
(Continued)

OTHER PUBLICATIONS

Office Action dated Sep. 24, 2021 in CN 201980008337.8.
(Continued)

*Primary Examiner* — Michael E. La Villa
(74) *Attorney, Agent, or Firm* — Foley & Lardner LLP (57) ABSTRACT

The present invention is intended to provide a roll-bonded laminate, in which an ultrathin metal layer is laminated on another metal without generation of wrinkles, cracks and the like. A roll-bonded laminate formed by lamination of at least three layers, which comprises a peelable carrier layer 10, an ultrathin metal layer 20 and a metallic foil 30, wherein the thickness of the ultrathin metal layer 20 is 0.5 μm or more and 20 μm or less.

8 Claims, 7 Drawing Sheets

(51) Int. Cl.
  B21D 39/03    (2006.01)
  B23K 20/04    (2006.01)
  B32B 15/04    (2006.01)
  B32B 15/18    (2006.01)
  B32B 15/20    (2006.01)
  C23C 30/00    (2006.01)
  C23F 17/00    (2006.01)
  C23G 5/00     (2006.01)
(52) U.S. Cl.
  CPC .......... *B32B 15/013* (2013.01); *B32B 15/015* (2013.01); *B32B 15/018* (2013.01); *B32B 15/04* (2013.01); *B32B 15/043* (2013.01); *B32B 15/18* (2013.01); *B32B 15/20* (2013.01); *C23C 30/00* (2013.01); *C23C 30/005* (2013.01); *C23F 17/00* (2013.01); *C23G 5/00* (2013.01); *Y10T 428/12438* (2015.01); *Y10T 428/12493* (2015.01); *Y10T 428/12556* (2015.01); *Y10T 428/12569* (2015.01); *Y10T 428/12708* (2015.01); *Y10T 428/12715* (2015.01); *Y10T 428/12722* (2015.01); *Y10T 428/12729* (2015.01); *Y10T 428/1275* (2015.01); *Y10T 428/12757* (2015.01); *Y10T 428/12806* (2015.01); *Y10T 428/12819* (2015.01); *Y10T 428/12826* (2015.01); *Y10T 428/12847* (2015.01); *Y10T 428/12854* (2015.01); *Y10T 428/12861* (2015.01); *Y10T 428/12868* (2015.01); *Y10T 428/12875* (2015.01); *Y10T 428/12882* (2015.01); *Y10T 428/12889* (2015.01); *Y10T 428/12896* (2015.01); *Y10T 428/12903* (2015.01); *Y10T 428/1291* (2015.01); *Y10T 428/12917* (2015.01); *Y10T 428/12931* (2015.01); *Y10T 428/12937* (2015.01); *Y10T 428/12944* (2015.01); *Y10T 428/2495* (2015.01); *Y10T 428/24959* (2015.01); *Y10T 428/24967* (2015.01); *Y10T 428/26* (2015.01); *Y10T 428/263* (2015.01); *Y10T 428/264* (2015.01); *Y10T 428/265* (2015.01)
(58) Field of Classification Search
  CPC ....... B32B 15/043; B32B 15/18; B32B 15/20; B21B 1/22; B23K 20/04; C23F 17/00; C23G 5/00; C23C 30/00; C23C 30/005; Y10T 428/1275; Y10T 428/12757; Y10T 428/12861; Y10T 428/12868; Y10T 428/12875; Y10T 428/12438; Y10T 428/12882; Y10T 428/12889; Y10T 428/12896; Y10T 428/12903; Y10T 428/1291; Y10T 428/12917; Y10T 428/12556; Y10T 428/12493; Y10T 428/12569; Y10T 428/12931; Y10T 428/12937; Y10T 428/12944; Y10T 428/12708; Y10T 428/12715; Y10T 428/12722; Y10T 428/12729; Y10T 428/2495; Y10T 428/24959; Y10T 428/24967; Y10T 428/12806; Y10T 428/12819; Y10T 428/12826; Y10T 428/12847; Y10T 428/12854; Y10T 428/26; Y10T 428/263; Y10T 428/264; Y10T 428/265; B21D 39/031
  See application file for complete search history.

(56) References Cited

U.S. PATENT DOCUMENTS

| | | | |
|---|---|---|---|
| 9,421,741 | B2 | 8/2016 | Oda et al. |
| 11,453,203 | B2* | 9/2022 | Sadaki ............... B23K 20/2275 |
| 2003/0127187 | A1* | 7/2003 | Rapuano ................. B32B 37/26 |
| | | | 156/308.2 |
| 2006/0163329 | A1* | 7/2006 | Saijo ...................... B23K 20/04 |
| | | | 228/115 |
| 2011/0290380 | A1 | 12/2011 | Okayama et al. |
| 2014/0339288 | A1 | 11/2014 | Otaki |
| 2016/0260980 | A1* | 9/2016 | Lee ........................ H01M 4/661 |

FOREIGN PATENT DOCUMENTS

| | | |
|---|---|---|
| JP | 3168930 B2 | 5/2001 |
| JP | 2002-127298 A | 5/2002 |
| JP | 2002-232096 A | 8/2002 |
| JP | 2004-249316 A | 9/2004 |
| JP | 5410646 B1 | 2/2014 |
| JP | 2014-223657 A | 12/2014 |
| JP | 2016-203409 A | 12/2016 |
| TW | 1223577 B | 11/2004 |
| WO | WO 2010/055612 A1 | 5/2010 |
| WO | WO 2018/147297 A1 * | 8/2018 |

OTHER PUBLICATIONS

International Search Report dated Jun. 18, 2019 in PCT/JP2019/010002.
Office Action dated Jan. 20, 2023 in CN 201980008337.8.

* cited by examiner

ROLL-BONDED LAMINATE AND METHOD FOR PRODUCING THE SAME

CROSS-REFERENCE TO RELATED APPLICATIONS

This application is the U.S. National Stage of PCT/JP2019/010002, filed Mar. 12, 2019, which claims priority to JP 2018-047241, filed Mar. 14, 2018 and JP 2018-120889, filed Jun. 26, 2018.

TECHNICAL FIELD

The present invention relates to a roll-bonded laminate and a method for producing the same.

BACKGROUND ART

Metallic materials are used in a wide variety of fields. For example, metallic materials are used as interior-protecting members, such as a shield cover for an integrated circuit of electronic equipment such as mobile electronic equipment. Such metallic materials are required to exhibit high strength and moldability. As such metallic materials, stainless steel has been extensively used. As other metallic materials, roll-bonded laminates (e.g., metal laminated materials or clad materials) comprising two or more types of metal plates or metallic foils laminated on top of each other are known. A roll-bonded laminate is a sophisticated metallic material with multiple properties that cannot be achieved by a single material. For example, a roll-bonded laminate composed of stainless steel and copper superposed on top of the other aimed at improved thermal conductivity has been studied.

As conventional roll-bonded laminates, for example, the roll-bonded laminates disclosed in Patent Literatures 1 and 2 are known. Patent Literature 1 discloses a chassis made of a clad material, in which a first layer made of austenite stainless steel, a second layer made of Cu or a Cu alloy stacked on the first layer, and a third layer made of austenite stainless steel stacked on a side of the second layer opposite from the first layer are roll-bonded to each other, wherein a thickness of the second layer is at least 15% of a thickness of the clad material, and a method for producing the same.

Also, Patent Literature 2 discloses a method for producing a Cu-stainless steel clad plate in which a Cu plate and a stainless steel plate subjected to brushing treatment are superposed on top of each other, the superposed plates are roll-bonded to each other via cold roll bonding at a rolling reduction of 2% to 10% to prepare a clad plate, and the clad plate is then heated to 500° C. to 1050° C. in vacuum at $10^{-4}$ Torr or lower.

CITATION LIST

Patent Literature

Patent Literature 1: JP Patent No. 5,410,646
Patent Literature 2: JP Patent No. 3,168,930

SUMMARY OF INVENTION

Technical Problem

In the aforementioned prior art techniques, the thickness of a copper layer (second layer) to be laminated on a stainless steel layer is, at most, several tens of μm to several hundreds of μm, and it has been difficult to bond a thin metal layer with a thickness of, for example, several μm to 20 μm, to another metal layer. As disclosed in Patent Literature 1, when a roll-bonded laminate consisting of copper and stainless steel is produced, the thickness reduction of the metal layer is possible by repeating bonding and thermal treatment. However, this method has been problematic in that, if a rolling reduction is increased, wrinkles or cracks may be generated on a metal layer or the flatness of the metal layer may be impaired, especially when a thin metal layer is to be bonded. This problem particularly occurs when the shape of a roll-bonded laminate is wide and/or long. In addition, as in the case of a roll-bonded laminate consisting of copper and aluminum, for example, if a thermal treatment is performed on such a roll-bonded laminate, it is likely that a fragile intermetallic compound may be formed between the layers, depending on constituent materials, and that the layers are peeled from each other, having such a site as a starting point.

As techniques of laminating an ultrathin layer consisting of another metal on a metal layer, methods such as plating or sputter deposition have also been known. However, in such plating, there may be cases where plating cannot be directly applied depending on the configuration of metal, as in the case of copper plating on aluminum, so that an underlayer for formation of a copper plating layer may impede the desired function, or where a plating solution may cause a great load on the environment, such as, for example, the use of cyan in the case of plating copper on stainless steel, or where plating is performed even on the back of a base material, so that a plating pretreatment solution or a plating solution may affect the back of the base material. Moreover, in the case of performing one-side masking, it is necessary to peel and remove the masking as a postprocess. Upon peeling the masking, if the thickness of a base material is thin, the base material may be deformed, thereby leading to creases or the like. Furthermore, in the case of sputter deposition, this method has been problematic in terms of productivity and costs.

Under the conventional circumstances, the present invention is intended to provide a roll-bonded laminate, in which an ultrathin metal layer is laminated on another metal without generation of wrinkles, cracks and the like, and a method for producing such laminate.

Solution to Problem

As a result of intensive studies, the present inventors have found that an ultrathin metal layer is bonded to a roll-bonded laminate in a state in which the ultrathin metal layer has previously been laminated on a carrier layer functioning a support, so that the aforementioned object can be achieved, thereby completing the present invention. Specifically, the subject matter of the present invention is as follows.

(1) A roll-bonded laminate formed by lamination of at least three layers, wherein
the roll-bonded laminate comprises a peelable carrier layer, an ultrathin metal layer, and a metallic foil, wherein the thickness of the ultrathin metal layer is 0.5 μm or more and 20 μm or less.

(2) The roll-bonded laminate according to the above (1), which has one or more intermediate layers comprising metal between the ultrathin metal layer and the metallic foil.

(3) The roll-bonded laminate according to the above (1) or (2), wherein the peel strength between the ultrathin metal layer and the metallic foil is greater than the carrier peel strength between the carrier layer and the ultrathin metal layer.

(4) A roll-bonded laminate formed by lamination of at least four layers, wherein
the roll-bonded laminate comprises a peelable first carrier layer, a first ultrathin metal layer, a second ultrathin metal layer, and a peelable second carrier layer, wherein the thickness of the ultrathin metal layers is 0.5 µm or more and 20 µm or less.
(5) The roll-bonded laminate according to any one of the above (1) to (4), wherein the ultrathin metal layer is a layer of metal selected from the group consisting of copper, iron, nickel, zinc, tin, chromium, gold, silver, platinum, cobalt, titanium, and an alloy comprising any of these metals as a base.
(6) The roll-bonded laminate according to any one of the above (1) to (3) and (5), wherein the metallic foil is a foil of metal selected from the group consisting of aluminum, iron, copper, nickel, magnesium, silver, gold, platinum, and an alloy comprising any of these metals as a base.
(7) A method for producing a roll-bonded laminate formed by lamination of at least three layers, the method comprising:
a step of preparing a laminate consisting of a peelable carrier layer and an ultrathin metal layer having a thickness of 0.5 µm or more and 20 µm or less, and a metallic foil,
a step of activating the surface of the ultrathin metal layer according to sputter etching,
a step of activating the surface of the metallic foil according to sputter etching, and
a step of roll-bonding the activated surfaces at a rolling reduction of 0% to 30%, wherein, after completion of the roll-bonding, a thermal treatment is not carried out, or a thermal treatment is carried out at 350° C. or lower.
(8) A method for producing a roll-bonded laminate formed by lamination of at least four layers, the method comprising:
a step of preparing a first laminate consisting of a peelable first carrier layer and a first ultrathin metal layer having a thickness of 0.5 µm or more and 20 µm or less, and a second laminate consisting of a peelable second carrier layer and a second ultrathin metal layer having a thickness of 0.5 µm or more and 20 µm or less,
a step of activating the surfaces of the ultrathin metal layers according to sputter etching, and
a step of roll-bonding the activated surfaces at a rolling reduction of 0% to 30%, wherein, after completion of the roll-bonding, a thermal treatment is not carried out, or a thermal treatment is carried out at 350° C. or lower.
(9) The method for producing a roll-bonded laminate according to the above (7), wherein an intermediate layer comprising metal is present on the surface of the metallic foil, and the surface of the intermediate layer is subjected to sputter etching.
(10) The method for producing a roll-bonded laminate according to any one of the above (7) to (9), wherein an intermediate layer comprising metal is present on the surface of the ultrathin metal layer, and the surface of the intermediate layer is subjected to sputter etching.
(11) The method for producing a roll-bonded laminate according to any one of the above (7) to (10), wherein the ultrathin metal layer is a layer of metal selected from the group consisting of copper, iron, nickel, zinc, tin, chromium, gold, silver, platinum, cobalt, titanium, and an alloy comprising any of these metals as a base.
(12) The method for producing a roll-bonded laminate according to any one of the above (7) and (9) to (11), wherein the metallic foil is a foil of metal selected from the group consisting of aluminum, iron, copper, nickel, magnesium, silver, gold, platinum, and an alloy comprising any of these metals as a base.
(13) A method for producing a roll-bonded laminate, in which the roll-bonded laminate is formed by lamination of at least two layers and comprises an ultrathin metal layer and a metallic foil, and the thickness of the ultrathin metal layer is 0.5 µm or more and 20 µm or less, wherein
the method comprises a step of peeling a carrier layer from the roll-bonded laminate according to the above (1).
(14) A method for producing a roll-bonded laminate, in which the roll-bonded laminate is formed by lamination of at least two layers and comprises a first ultrathin metal layer and a second ultrathin metal layer, and the thickness of the ultrathin metal layers is 0.5 µm or more and 20 µm or less, wherein the method comprises:
a step of peeling a first carrier layer from the roll-bonded laminate according to the above (4), and
a step of peeling a second carrier layer from the roll-bonded laminate according to the above (4).
(15) A roll-bonded laminate, in which an ultrathin metal layer and a metallic foil are laminated on each other, wherein
the ultrathin metal layer is a copper layer having a thickness of 0.5 µm or more and 20 µm or less, the metallic foil is a foil of metal selected from the group consisting of aluminum, iron, copper, nickel, magnesium, silver, gold, platinum, and an alloy comprising any of these metals as a base, and the standard deviation 6 of the thickness of the ultrathin metal layer is less than 1 µm.

The present description includes the contents disclosed in Japanese Patent Application No. 2018-047241 and Japanese Patent Application No. 2018-120889, from which the present application claims priority.

Advantageous Effects of Invention

According to the present invention, a roll-bonded laminate, on which an ultrathin metal layer having a thickness of 0.5 µm or more and 20 µm or less is laminated without generation of wrinkles or cracks, can be obtained.

Moreover, the surfaces of a laminate consisting of a peelable carrier layer and an ultrathin metal layer and a laminate consisting of a metallic foil or a peelable carrier layer and an ultrathin metal layer are activated according to sputter etching and are then bonded to each other, so that a roll-bonded laminate that is excellent in terms of the thickness accuracy of the ultrathin metal layer can be obtained. Furthermore, since the carrier layer functions as a support and/or a protective layer for the ultrathin metal layer, the present roll-bonded laminate is excellent in terms of the ease of handling of the ultrathin metal layer before bonding. In addition, even after formation of the roll-bonded laminate, since the carrier layer functions as a supporting layer and/or a protective layer for the roll-bonded laminate, the roll-bonded laminate is also excellent in terms of ease of handling.

DESCRIPTION OF EMBODIMENTS

Hereinafter, the present invention will be described in detail.

Figure 1:
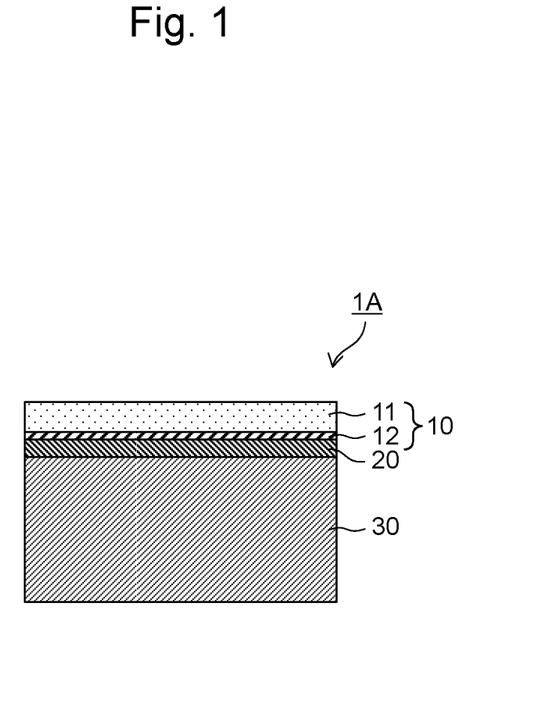
FIG. 1 is a cross-sectional view of a roll-bonded laminate according to a first embodiment of the present invention.

FIG. 1 shows a cross-section of a roll-bonded laminate according to a first embodiment of the present invention. A roll-bonded laminate 1A shown in FIG. 1 is schematically configured by lamination of a peelable carrier layer 10 composed of a carrier layer body 11 and a peel layer 12, an ultrathin metal layer 20, and a metallic foil 30 in this order.

The carrier layer body 11 has a sheet shape and functions as a supporting material or a protective layer for preventing generation of wrinkles or creases on the roll-bonded laminate 1A or scratches on the ultrathin metal layer 20. Examples of the carrier layer body 11 may include a foil and a plate, consisting of copper, aluminum, or an alloy thereof (stainless steel, brass, etc.), or consisting of a resin whose surface is coated with a metal, or the like. The carrier layer body 11 is preferably a copper foil.

The thickness of the carrier layer body 11 is not particularly limited, and it is set, as appropriate, depending on desired properties such as flexibility. Specifically, the thickness of the carrier layer body 11 is preferably set to be approximately 10 μm or more and 100 μm or less. If the thickness is too thin, it is likely that the ease of handling of a laminate consisting of the carrier layer 10 and the ultrathin metal layer 20 is unfavorably impaired. That is to say, there may be a case where the laminate is deformed when it is handled, so that wrinkles or cracks may be generated on the ultrathin metal layer 20. On the other hand, if the carrier layer body 11 is too thick, it has excessive rigidity as a supporting material, and thus, it may unfavorably become difficult to peel the carrier layer body 11 from the ultrathin metal layer 20. Further, the cost of producing a laminate consisting of a carrier layer and an ultrathin metal layer increases.

The peel layer 12 reduces the peel strength of the carrier layer body 11, and also has the function of suppressing mutual diffusion that may occur between the carrier layer body 11 and the ultrathin metal layer 20 when the laminate consisting of the carrier layer 10 and the ultrathin metal layer 20 is heated to bond it to the metallic foil 30. The peel layer 12 may be either an organic peel layer or an inorganic peel layer. Examples of components used in the organic peel layer may include a nitrogen-containing organic compound, a sulfur-containing organic compound, and carboxylic acid. Examples of the nitrogen-containing organic compound may include a triazole compound and an imidazole compound. Examples of the triazole compound may include 1,2,3-benzotriazole, carboxybenzotriazole, N',N'-bis (benzotriazolylmethyl)urea, 1H-1,2,4-triazole, and 3-amino-1H-1,2,4-triazole. Examples of the sulfur-containing organic compound may include mercaptobenzothiazole, thiocyanic acid, and 2-benzimidazolethiol. Examples of the carboxylic acid may include monocarboxylic acid and dicarboxylic acid. On the other hand, examples of components used in the inorganic peel layer may include Ni, Mo, Co, Cr, Fe, Ti, W, P, Zn, and a chromated film. Besides, the peel layer 12 can be formed, for example, by allowing a solution containing components of the peel layer 12 to come into contact with the surface of the carrier layer body 11, so as to immobilize the peel layer components on the surface of the carrier layer body 11. When the carrier layer body 11 is allowed to come into contact with the solution containing components of the peel layer 12, this contact may be carried out by immersion of the carrier layer body 11 in the solution containing the peel layer components, spraying of the solution containing the peel layer components onto the carrier layer body 11, flowing down of the solution containing the peel layer components to the carrier layer body 11, and the like Thereafter, drying or the like is carried out to immobilize the peel layer components on the carrier layer body 11. Alternatively, a method of forming a film of the components of the peel layer 12 according to a vapor phase method such as deposition or sputtering can also be adopted.

The thickness of the peel layer 12 is typically 1 nm or more and 1 μm or less, and preferably 5 nm or more and 500 nm or less, but is not limited thereto. If the thickness of the peel layer 12 is too thin, it causes such a problem that separation of the peel layer 12 from the ultrathin metal layer 20 cannot be sufficiently carried out and peeling failure occurs. On the other hand, if the thickness of the peel layer 12 is too thick, the production costs increase, although it is possible to peel it from the ultrathin metal layer. Hence, taking into consideration the balance between these factors, the thickness of the peel layer 12 is determined, as appropriate.

The metal that constitutes the ultrathin metal layer 20 can be selected, as appropriate, depending on the intended use of the roll-bonded laminate or desired properties. Specific examples of the metal constituting the ultrathin metal layer 20 may include copper, iron, nickel, zinc, tin, chromium, gold, silver, platinum, cobalt, titanium, and an alloy comprising any of these metals as a base. In particular, the metal constituting the ultrathin metal layer 20 is preferably a layer of metal selected from the group consisting of copper, nickel, and an alloy comprising any of these metals as a base. By roll-bonding such a metal to the metallic foil 30, the radiation performance and lightness of the roll-bonded laminate can be improved, and a roll-bonded laminate that is preferably used, for example, as a box for mobile electronics can be obtained.

The thickness of the ultrathin metal layer 20 is 0.5 μm or more and 20 μm or less. It is preferably 1 μm or more and 12 μm or less, and more preferably 1 μm or more and 7 μm or less. Herein, the thickness of the ultrathin metal layer 20 means a mean value of values obtained by taking a photomicrograph of the cross-section of the roll-bonded laminate 1A, then calculating the thickness of the ultrathin metal layer in each of any given 10 points on the photomicrograph. Besides, in the production of a roll-bonded laminate, since the ultrathin metal layer 20 is bonded to the metallic foil 30 at a predetermined rolling reduction, the thickness of the ultrathin metal layer 20 in the roll-bonded laminate 1A becomes thinner than the thickness of the ultrathin metal layer 20 before the bonding.

In addition, the standard deviation δ of the thickness of the ultrathin metal layer 20 is preferably less than 1 µm. Herein, the standard deviation δ of the thickness of the ultrathin metal layer 20 means a standard deviation obtained by taking a photomicrograph of the cross-section of a roll-bonded laminate, then measuring the thickness $t_1$ of the ultrathin metal layer 20 at equally spaced 10 points on a cross-section with a width of 300 µm of the photomicrograph, and then obtaining the standard deviation δ from the obtained measurement values at the 10 points.

Such an ultrathin metal layer 20 can be formed on the peel layer 12 according to a wet film formation method such as an electroless plating method or an electrolytic plating method, a dry firm formation method such as sputtering or chemical vapor deposition, or a combination thereof.

When the peel strength between the ultrathin metal layer 20 and the metallic foil 30 is compared with the peel strength between the carrier layer 10 and the ultrathin metal layer 20 (which is referred to as a "carrier peel strength" in the present description), the peel strength between the ultrathin metal layer 20 and the metallic foil 30 is preferably greater than the peel strength between the carrier layer 10 and the ultrathin metal layer 20. Thereby, when the carrier layer 10 is peeled from the ultrathin metal layer 20, it can be peeled therefrom without generation of wrinkles, cracks and the like on the ultrathin metal layer 20. However, if the value of the peel strength between the ultrathin metal layer 20 and the metallic foil 30 is too close to the value of the carrier peel strength, there may be a case where it becomes practically difficult to peel only the carrier layer 10 without affecting the interface between the ultrathin metal layer 20 and the metallic foil 30. Thus, a difference between the peel strength between the ultrathin metal layer 20 and the metallic foil 30, and the carrier peel strength, is preferably 0.5 N/20 mm or more. Such a difference is more preferably 1.0 N/20 mm or more, and most preferably 3.0 N/20 mm or more. With regard to specific values of the peel strength between the ultrathin metal layer 20 and the metallic foil 30 and the carrier peel strength, the peel strength between the ultrathin metal layer 20 and the metallic foil 30 is preferably 1 N/20 mm or more. Moreover, the carrier peel strength between the carrier layer 10 and the ultrathin metal layer 20 may be greater than 0, and is preferably less than 1 N/20 mm. However, there may be a case where an accurate peel strength cannot be measured due to the influence of the rigidity of a material to be peeled (i.e., the carrier layer 10, the ultrathin metal layer 20, and the metallic foil 30) in a region of lower than about 0.1 N/20 mm. Thus, the carrier peel strength is more preferably in the range of 0.1 N/20 mm or more and less than 1 N/20 mm. Besides, the value of the above-described peel strength or carrier peel strength means a power required when a test piece with a width of 20 mm is produced from the roll-bonded laminate 1A, the ultrathin metal layer 20 is partially peeled from the metallic foil 30, or the carrier layer 10 is partially peeled from the ultrathin metal layer 20, a thicker film side or a harder film side is immobilized, and the other layer is pulled to the side 180° opposite to the immobilized side (unit: N/20 mm).

Various types of metallic plate materials or foil materials can be applied as such a metallic foil 30, and the material of the metallic foil 30 can be selected, as appropriate, depending on the intended use of the roll-bonded laminate, etc. For example, a metallic foil selected from the group consisting of aluminum, iron, copper, nickel, magnesium, silver, gold, platinum, and an alloy comprising any of these metals as a base is preferably used as a metallic foil. Specific examples of such a metallic foil may include: foils of stainless steel such as SUS304 or SUS316; foils of magnesium alloys such as AZ31, AZ61, AZ91, or LZ91; and foils of aluminum or aluminum alloys such as A1050, A1100, or 1N30.

As long as the thickness of the metallic foil 30 is 0.01 mm or more, it is generally applicable. From the viewpoint of the mechanical strength and workability of the obtained roll-bonded laminate, the thickness of the metallic foil 30 is preferably in the range of 0.01 mm or more and 1.8 mm or less. Taking into consideration ease of handling, the thickness of the metallic foil 30 is preferably 0.015 mm or more. On the other hand, from the viewpoint of the weight reduction or thickness reduction of the roll-bonded laminate, the thickness of the metallic foil 30 before bonding is more preferably 1.2 mm or less, further preferably 0.8 mm or less, and particularly preferably 0.5 mm or less. However, since the thickness of the roll-bonded laminate can be reduced by subjecting the roll-bonded laminate to rolling again, after bonding. Accordingly, the thickness of the metallic foil before bonding is not limited thereto. Besides, the thickness of the metallic foil 30 before bonding can be measured with the use of, for example, a micrometer, and such a thickness is determined by measuring thickness at randomly selected 10 points on the surface of the target metallic foil and then calculating the average thereof. Concerning the foil to be used, a deviation from the average of values measured at 10 points is preferably within 10%. When a thin foil with a thickness of less than 1 mm is used as a metallic foil to be bonded, in particular, performance such as radiation performance may vary when a deviation is large. Thus, a smaller deviation is preferable.

Figure 2:
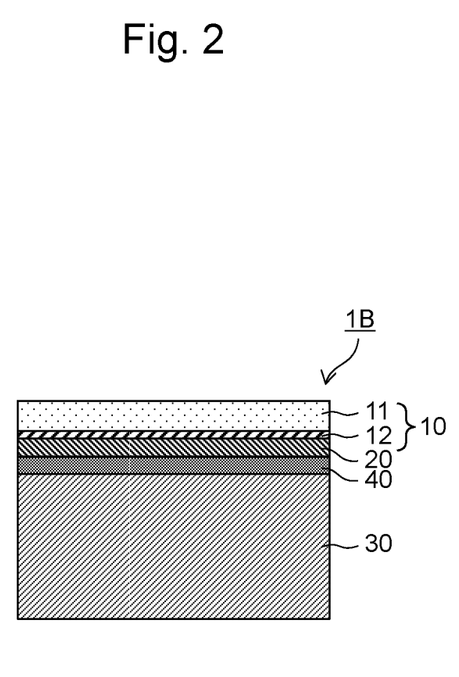
FIG. 2 is a cross-sectional view of a roll-bonded laminate according to a second embodiment of the present invention.

In addition, in a second embodiment of the present invention, as shown in FIG. 2, the roll-bonded laminate may comprise an intermediate layer 40 comprising a metal between the ultrathin metal layer 20 and the metallic foil 30. This intermediate layer 40 may consist of a single layer, or may be formed by lamination of two or more layers. The intermediate layer 40 comprising a metal may be, for example, a metal layer established on the ultrathin metal layer 20 or the metallic foil 30 according to deposition, electroplating, or electroless plating.

The metal constituting the intermediate layer 40 is preferably a metal selected from the group consisting of a single metal selected from copper, iron, nickel, zinc, chromium, cobalt, titanium, tin, platinum, silver and gold, or an alloy comprising these metals. By establishing such a metal layer 40, the surface of the ultrathin metal layer 20 or the metallic foil 30 can be protected, and also, the adhesiveness between the ultrathin metal layer 20 and the metallic foil 30 can be improved. What is more, the function specific to the metal layer 40 can be imparted (for example, the function as an etching stopper layer upon the etching processing, etc.). The thickness of the intermediate layer 40 is not particularly limited, as long as it is a thickness capable of exhibiting functions such as the improvement of the adhesiveness. Specifically, the thickness of the intermediate layer is preferably 0.5 µm or more and 20 µm or less, and more preferably 0.5 µm or more and 10 µm or less.

Moreover, although it is not shown in the drawings, on the surface of the metallic foil 30 on the side opposite to the side at which the metallic foil 30 is contacted with the ultrathin metal layer 20 or the intermediate layer 40 in the roll-bonded laminate 1A or 1B, a protective layer can be established, as necessary, for the purpose of anti-corrosion, oxidation prevention, discoloration prevention or the like, to such an extent that it does not impair functions such as thermal conductivity or radiation performance. Examples of protective layers for a metallic foil composed of a copper may include a chemically-treated layer and an Ni-plated layer. Examples of protective layers for a metallic foil composed of a magnesium alloy may include chemically treated layers, such as layers subjected to treatment with phosphoric acid, chromate treatment, and anodic oxidation.

Subsequently, a method for producing a roll-bonded laminate is described. The roll-bonded laminate 1A shown in FIG. 1 can be obtained by preparing a laminate consisting of a peelable carrier layer 10 and an ultrathin metal layer 20, and a metallic foil 30, and then subjecting such layers to various techniques, such as cold roll bonding, hot roll bonding or surface-activated bonding, to bond them to each other and to closely contact between the layers. Besides, bonding and/or a thermal treatment performed under a high pressure upon production of the roll-bonded laminate are likely to significantly change a metallic texture in each layer of the roll-bonded laminate before and after the bonding and/or the thermal treatment, and is also likely to impair the properties of the roll-bonded laminate. Accordingly, it is preferable to select bonding and/or thermal treatment conditions capable of avoiding such change in the metal texture.

In the case of cold roll bonding, bonding is preferably followed by stabilizing thermal treatment. According to hot roll bonding, layers are roll-bonded to each other while applying heat at a temperature equivalent to or higher than the recrystallization temperature for the laminate. Compared with cold roll bonding, layers can be bonded to each other at a lower force, although an intermetallic compound is likely to be generated at the bonding interface. In order to prevent an intermetallic compound from being generated, accordingly, heating temperature, a heating duration, and other conditions should be adequately selected. For example, when the ultrathin metal layer 20 is copper and the metallic foil 30 is aluminum, a fragile intermetallic compound is easily generated at the bonding interface by heating. Accordingly, the thermal treatment temperature and the heating temperature applied upon performing hot roll bonding are preferably as low as possible.

Figure 3:
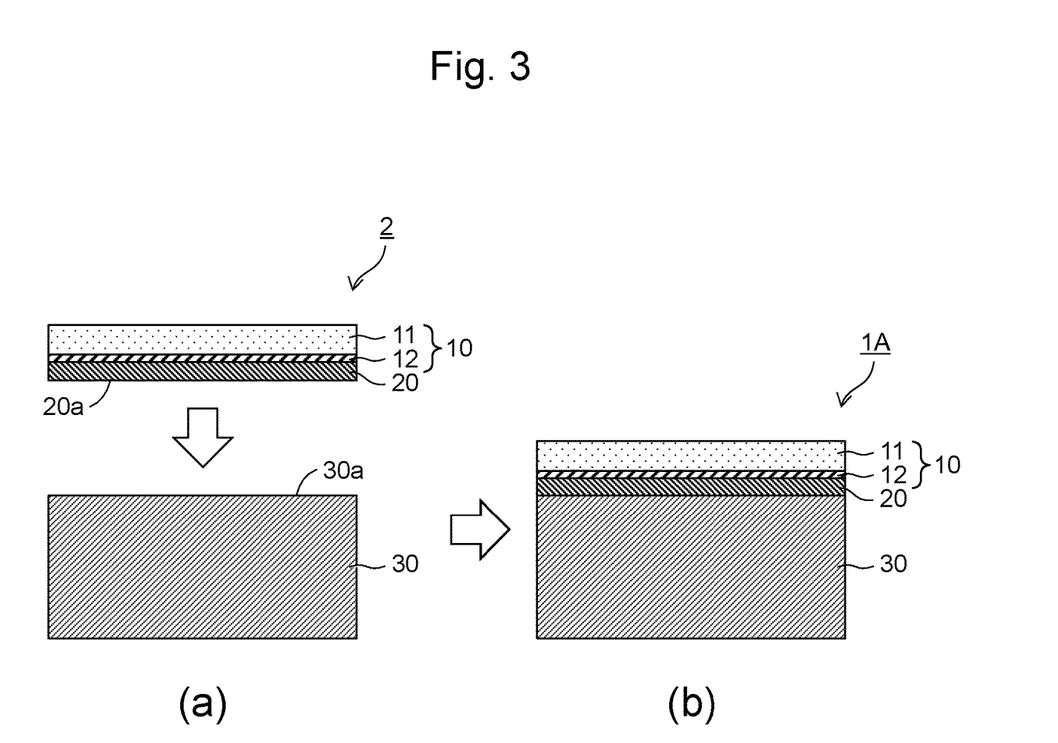
FIG. 3 is a view showing a production process of a roll-bonded laminate according to a first embodiment of the present invention.

A preferred aspect of a method for producing the roll-bonded laminate 1A is as described below. At the outset, as shown in FIG. 3, a laminate 2 consisting of a peelable carrier layer 10 and an ultrathin metal layer 20 having a thickness of 0.5 μm or more and 20 or less, and a metallic foil 30, are prepared. The surface 20a of the ultrathin metal layer 20 is activated by sputter etching, the surface 30a of the metallic foil 30 is activated by sputter etching, and the thus activated surfaces are roll-bonded to each other (FIG. 3(a)), thereby producing the roll-bonded laminate 1A (FIG. 3(b)). Upon such roll-bonding, a rolling reduction is preferably set at 0% to 30%, and more preferably at 0% to 15%. Since the rolling reduction can be reduced in the above-described production method according to surface activation and bonding, it is possible to perform bonding while maintaining the function of the peel layer 12, and also, the ultrathin metal layer 20 having excellent thickness accuracy can be formed without generation of wrinkles, cracks and the like. Moreover, since the swelling of the interface between the ultrathin metal layer 20 and the metallic foil 30 can be reduced, when pattern etching is performed on the produced roll-bonded laminate 1A so that the ultrathin metal layer or the metallic foil can be used as a circuit electrode, it is excellent in terms of thickness accuracy. Accordingly, the present production method is advantageously applied to form an accurate circuit. In particular, in a case where an ultrathin metal layer with a thickness of 0.5 μm or more and 20 μm or less is formed on a thin metallic foil 30 having a thickness of 0.8 mm or less or 0.5 mm or less, a warp has been easily generated according to the conventional production methods. However, by roll-bonding the laminate 2 consisting of the peelable carrier layer 10 and the ultrathin metal layer 20, and the metallic foil 30, to each other, as described above, it becomes possible to suppress generation of such a warp, and even when the shape of the roll-bonded laminate is wide and long, the present production method exhibits effects.

Sputter-etching treatment is carried out, for example, by preparing a laminate 2 or a metallic foil 30 to be bonded to each other in the form of long coils with a width of 100 mm to 600 mm, designating the bonding surface of the laminate 2 or the metallic foil 30 as a ground-connected electrode, applying an alternating current of 1 MHz to 50 MHz to a region between the electrode and the other insulated electrode to generate a glow discharge, and adjusting an area of the electrode exposed to the plasma generated by the glow discharge to one third or less of the area of the other electrode. During the sputter-etching, the ground-connected electrode is in the form of a cooling roll, which prevents the transfer materials from temperature increase.

Sputter-etching treatment is intended to completely remove substances adsorbed to the surface and remove a part of or the entire oxide layer on the surface by subjecting the bonding surface of the laminate 2 or the metallic foil 30 to sputtering with inert gas in vacuum. When the ultrathin metal layer 20 or the metallic foil 30 is composed of aluminum, magnesium, or an alloy comprising such a as a base, in particular, it is not necessary to completely remove the oxide layer, and the metal layer can be sufficiently bonded in the presence of a remaining part of the oxide layer. In the presence of a remaining part of the oxide layer, the duration of the sputter-etching treatment is shortened to a significant extent, and productivity of a metal laminate is improved, compared with the case in which the oxide layer is completely removed. In contrast, it is preferable that an oxide layer on the copper surface be completely removed. Examples of inert gas that can be applied include argon, neon, xenon, krypton, and a mixed gas comprising at least one of the inert gases mentioned above. While the etching amount varies depending on a metal type, a substance adsorbed to the surface of the ultrathin metal layer 20 or the metallic foil 30 can be completely removed with the etching amount of about 1 nm, and the oxide layer of copper can be generally removed with the etching amount of about 5 nm to 12 nm (in terms of $SiO_2$).

Sputter-etching treatment conditions can be adequately determined in accordance with, for example, the type of the ultrathin metal layer 20 or the metallic foil 30. For example, sputter etching can be carried out in vacuum at a plasma output of 100 W to 10 kW and a line velocity of 0.5 m/min to 30 m/min. While a higher degree of vacuum is preferable in order to prevent a substance from being re-adsorbed to the surface, a degree of vacuum of, for example, $1 \times 10^{-5}$ Pa to 10 Pa is sufficient.

The surfaces of the ultrathin metal layer 20 or the metallic foil 30 subjected to sputter etching can be roll-bonded to each other. A line pressure load for roll bonding is not particularly limited. For example, a line pressure load can be adjusted within a range of 0.1 tf/cm to 10 tf/cm. When a diameter of a pressure roll is 100 mm to 250 mm, for example, a line pressure load for roll bonding is more preferably 0.1 tf/cm to 3 tf/cm, and further preferably 0.3 tf/cm to 1.8 tf/cm. When a roll diameter is increased or the laminate 2 or the metallic foil 30 is thick before bonding, however, it is occasionally necessary to increase a line pressure load to maintain a pressure that is necessary at the time of bonding, and the line pressure load is not limited to the level described above. When a line pressure load is excessively high, in contrast, the bonding interface is likely to be deformed, in addition to the surface of the ultrathin metal layer 20 or the metallic foil 30. This may deteriorate thickness accuracy of each metal layer of the roll-bonded laminate. When a line pressure load is high, in addition, work strain occurring at the time of bonding may be increased.

A rolling reduction at the time of roll bonding is preferably 30% or less, more preferably 8% or less, and further preferably 6% or less. It is not necessary that thickness is changed before and after roll bonding. Thus, the lower limit of the rolling reduction is 0%.

Roll bonding is preferably carried out in the non-oxidizing atmosphere, such as in an inert gas atmosphere (e.g., Ar), so as to prevent oxygen from being re-adsorbed onto the surface of the ultrathin metal layer 20 or the metallic foil 30 and to prevent the bonding strength therebetween from lowering.

In addition, the roll-bonded laminate obtained by roll bonding can be further subjected to thermal treatment, according to need. As a result of thermal treatment, work strain can be eliminated from the ultrathin metal layer 20 or the metallic foil 30, and adhesion between layers can be improved. When thermal treatment is conducted at high temperature for a long period of time, blisters are generated on the carrier layer 10, having the peel layer 12 as a starting point, and having the generated blisters as starting points, the carrier layer 10 may be peeled, or in contrast, the adhesiveness between the carrier layer 10 and the ultrathin metal layer 20 may be enhanced due to mutual diffusion or the like and thereby, it may become difficult peel the carrier layer 10 off. Moreover, depending on the combination of the ultrathin metal layer 20 and the metallic foil 30, an intermetallic compound may be generated at the interface, and adhesiveness (peel strength) may tend to be deteriorated. Thus, the above-described thermal treatment is carried out at a temperature of 350° C. or lower. The temperature for the thermal treatment is preferably 300° C. or lower, and particularly preferably 250° C. or lower. Otherwise, it is preferable not to perform the thermal treatment after the roll-bonding. Besides, if the thermal treatment is carried out after the carrier layer 10 has been peeled and/or removed from the roll-bonded laminate after the bonding, it may be carried out at the interface between the ultrathin metal layer 20 and the metallic foil 30 in a temperature range in which no intermetallic compounds are generated. For example, in a case where the combination of the ultrathin metal layer 20 and the metallic foil 30 after the peeling and/or removal of the carrier layer 10 are copper and stainless steel, it also possible to perform a thermal treatment at a high temperature of 600° C. or higher.

The roll-bonded laminate produced via surface-activated bonding described above can further be subjected to rolling (re-rolling), according to need. Thus, a high value-added and thin roll-bonded laminate can be produced from a cost-effective thick original plate. In addition, materials can be conditioned by conditioning rolling. When re-rolling is carried out, a rolling reduction is measured in the form of a re-rolled laminate. Specifically, the ratio $T/T_0$ between the total thickness $T_0$ of the laminate 2 and the metallic foil 30 before bonding and the thickness T of the roll-bonded laminate after re-rolling is a rolling reduction.

According to the aforementioned steps, a roll-bonded laminate 1A can be obtained. As shown in FIG. 2, in a case where a roll-bonded laminate 1B having an intermediate layer 40 comprising a metal between an ultrathin metal layer 20 and a metallic foil 30 is produced, a laminate consisting of a peelable carrier layer 10 and an ultrathin metal layer 20 with a thickness of 0.5 μm or more and 20 μm or less having an intermediate layer on the surface thereof, or a metallic foil having an intermediate layer on the surface thereof is prepared. Then, the surface of such an intermediate layer subjected to sputter etching is bonded to the other metallic foil or ultrathin metal layer, the surface of which is activated by sputter etching. The roll-bonded laminate 1B can be obtained according to the aforementioned method for producing the roll-bonded laminate 1A, except for the aforementioned operations.

Figure 4:
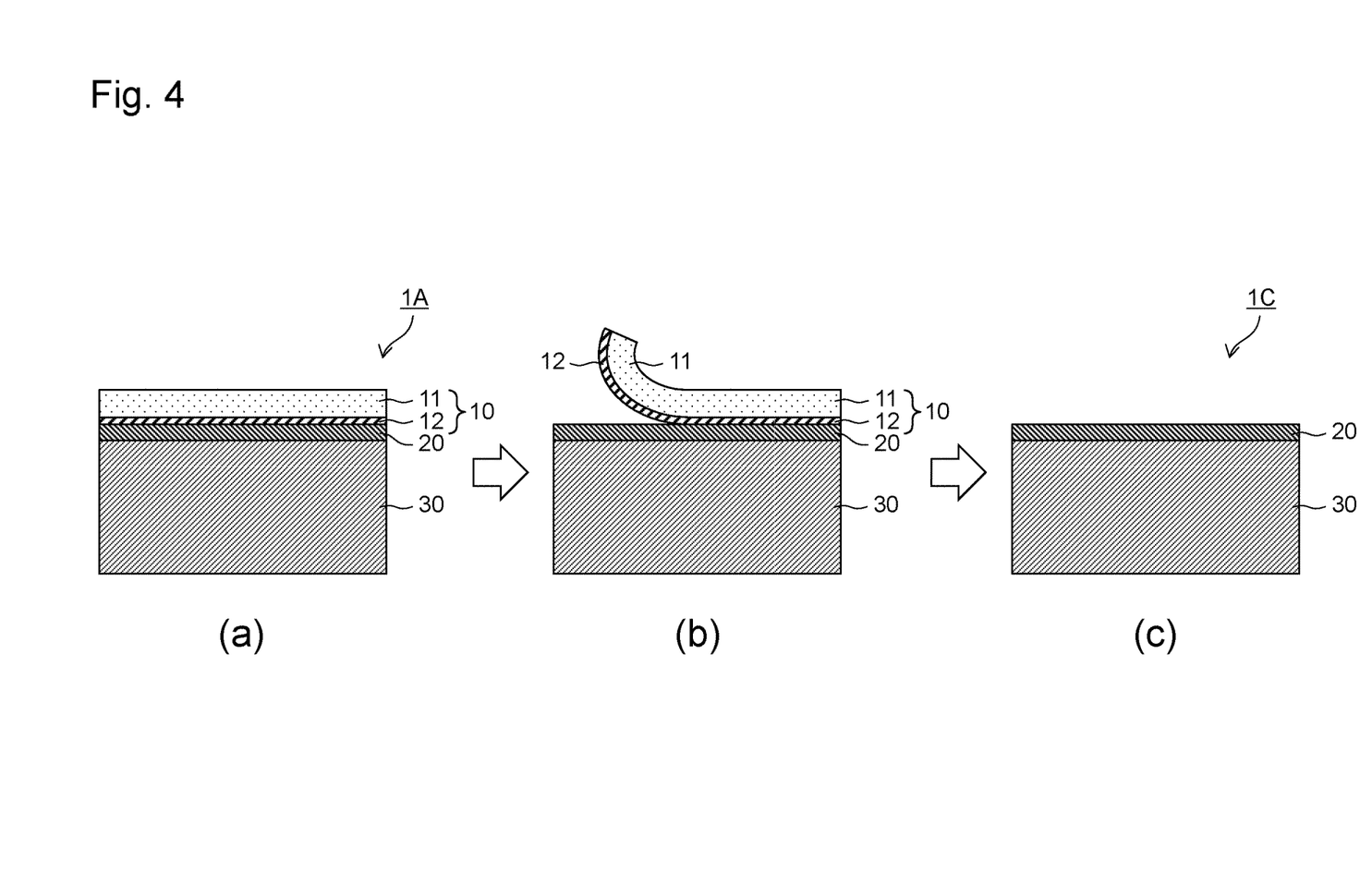
FIG. 4 is a view showing a production process of a roll-bonded laminate according to a third embodiment of the present invention.

Next, a method for producing a roll-bonded laminate according to a third embodiment of the present invention is described, following FIG. 4. A roll-bonded laminate 1C as shown in FIG. 4 is a roll-bonded laminate having a two-layer structure, in which an ultrathin metal layer 20 having a thickness of 0.5 μm or more and 20 μm or less and a metallic foil 30 are laminated on each other. This roll-bonded laminate 1C can be obtained from the roll-bonded laminate 1A comprising a carrier layer 10 shown in FIG. 1. Specifically, as shown in FIG. 4, the roll-bonded laminate 1A is prepared (FIG. 4(a)), and the carrier layer 10 is peeled from the roll-bonded laminate 1A (FIG. 4(b)), so as to obtain the roll-bonded laminate 1C having a two-layer structure (FIG. 4(c)).

The roll-bonded laminate 1C having a two-layer structure has an ultrathin metal layer 20 with a thickness of 0.5 μm or more and 20 μm or less that is excellent in terms of thickness accuracy, and neither cracks nor wrinkles are generated on the ultrathin metal layer 20. Such a roll-bonded laminate 1C can be preferably utilized in the form of a molded product, for example, a cover, a housing, a case, a reinforcement member, or a functional member such as a radiation/electromagnetic wave shield of various types of electronic equipment, such as mobile electronic equipment and PC, an electronic member for transportation means such as an automobile, or an electronic member for home appliance.

Moreover, since the roll-bonded laminate 1C can be laminated with an ultrathin metal layer having excellent thickness accuracy, a fine circuit can be formed thereon according to a selective etching treatment, and thus, the roll-bonded laminate 1C can also be used as a substrate for fine electronic circuits.

Figure 5:
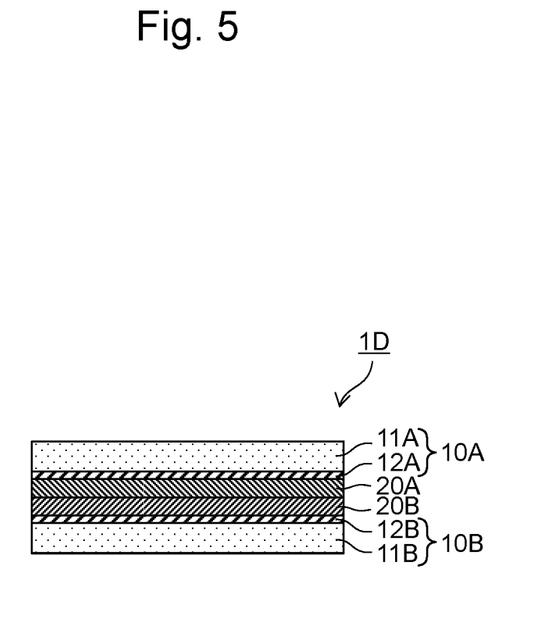
FIG. 5 is a cross-sectional view of a roll-bonded laminate according to a fourth embodiment of the present invention.

Next, a roll-bonded laminate according to a fourth embodiment of the present invention is described based on FIG. 5. A roll-bonded laminate 1D as shown in FIG. 5 is a roll-bonded laminate having a four-layer structure, in which a peelable first carrier layer 10A, a first ultrathin metal layer 20A, a second ultrathin metal layer 20B, and a peelable second carrier layer 10B are laminated on one another in this order. The thickness of the first ultrathin metal layer 20A and the thickness of the second ultrathin metal layer 20B are each 0.5 μm or more and 20 μm or less, preferably 1 μm or more and 12 μm or less, and more preferably 1 μm or more and 7 μm or less. The peelable first carrier layer 10A is composed of a first carrier layer body 11A and a first peel layer 12A, and the peelable second carrier layer 10B is composed of a second carrier layer body 11B and a second peel layer 12B, respectively. The configurations of the carrier layer body, the peel layer and the ultrathin metal layer are the same as those described in the above-described first embodiment.

Figure 6:
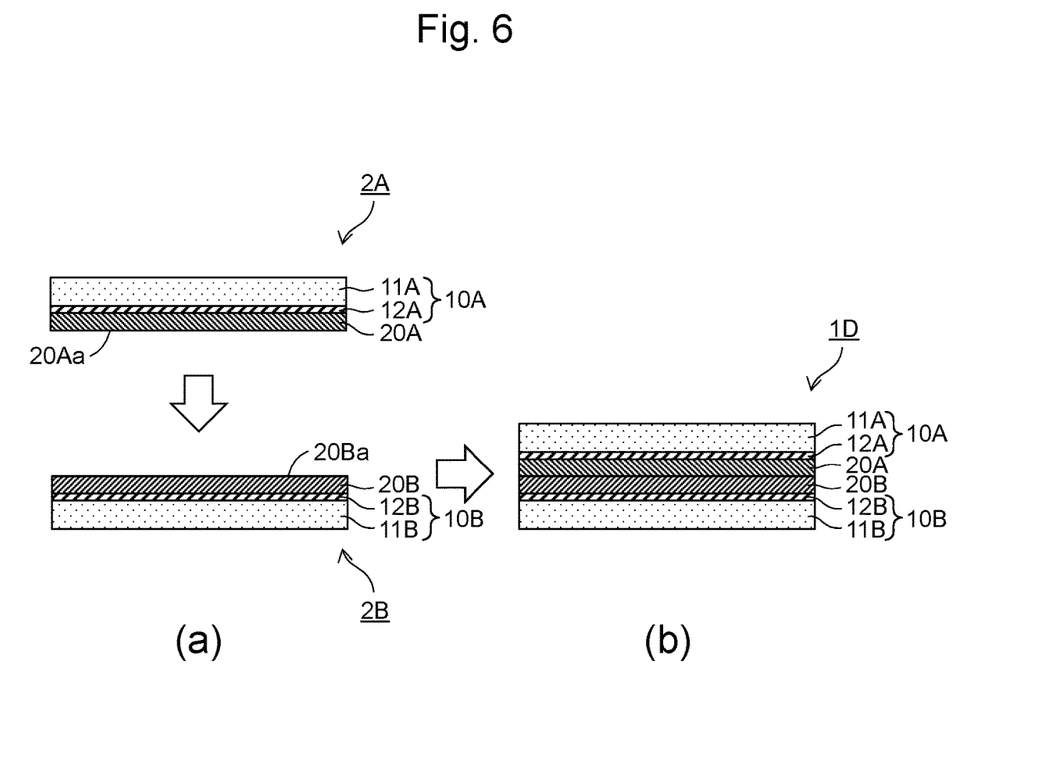
FIG. 6 is a view showing a production process of a roll-bonded laminate according to a fourth embodiment of the present invention.

FIG. 6 is a view showing a step of producing the roll-bonded laminate according to the fourth embodiment. As shown in FIG. 6, for the production of the roll-bonded laminate 1D according to the fourth embodiment, first, a first laminate 2A consisting of a peelable first carrier layer 10A and a first ultrathin metal layer 20A having a thickness of 0.5 µm or more and 20 µm or less, and a second laminate 2B consisting of a peelable second carrier layer 10B and a second ultrathin metal layer 20B having a thickness of 0.5 µm or more and 20 µm or less are prepared. Subsequently, the surface 20Aa of the first ultrathin metal layer 20A and the surface 20Ba of the second ultrathin metal layer 20B are activated by sputter etching, and the thus activated surfaces are roll-bonded to each other at a rolling reduction of 0% to 30% (FIG. 6(a)). Thereby, the roll-bonded laminate 1D can be obtained (FIG. 6(b)). As in the case of FIG. 3, it is preferable that, after completion of the roll-bonding, a thermal treatment be carried out at a temperature of 350° C. or lower, or such a thermal treatment be not carried out. Besides, if the thermal treatment is carried out after the carrier layers 10A and 10B have been peeled and/or removed from the roll-bonded laminate after the bonding, it may be carried out at the interface between the ultrathin metal layer 20 and the metallic foil 30 in a temperature range in which no intermetallic compounds are generated. Other configurations such as conditions applied upon roll-bonding are the same as those upon the production of the roll-bonded laminate 1A shown in FIG. 3.

Figure 7:
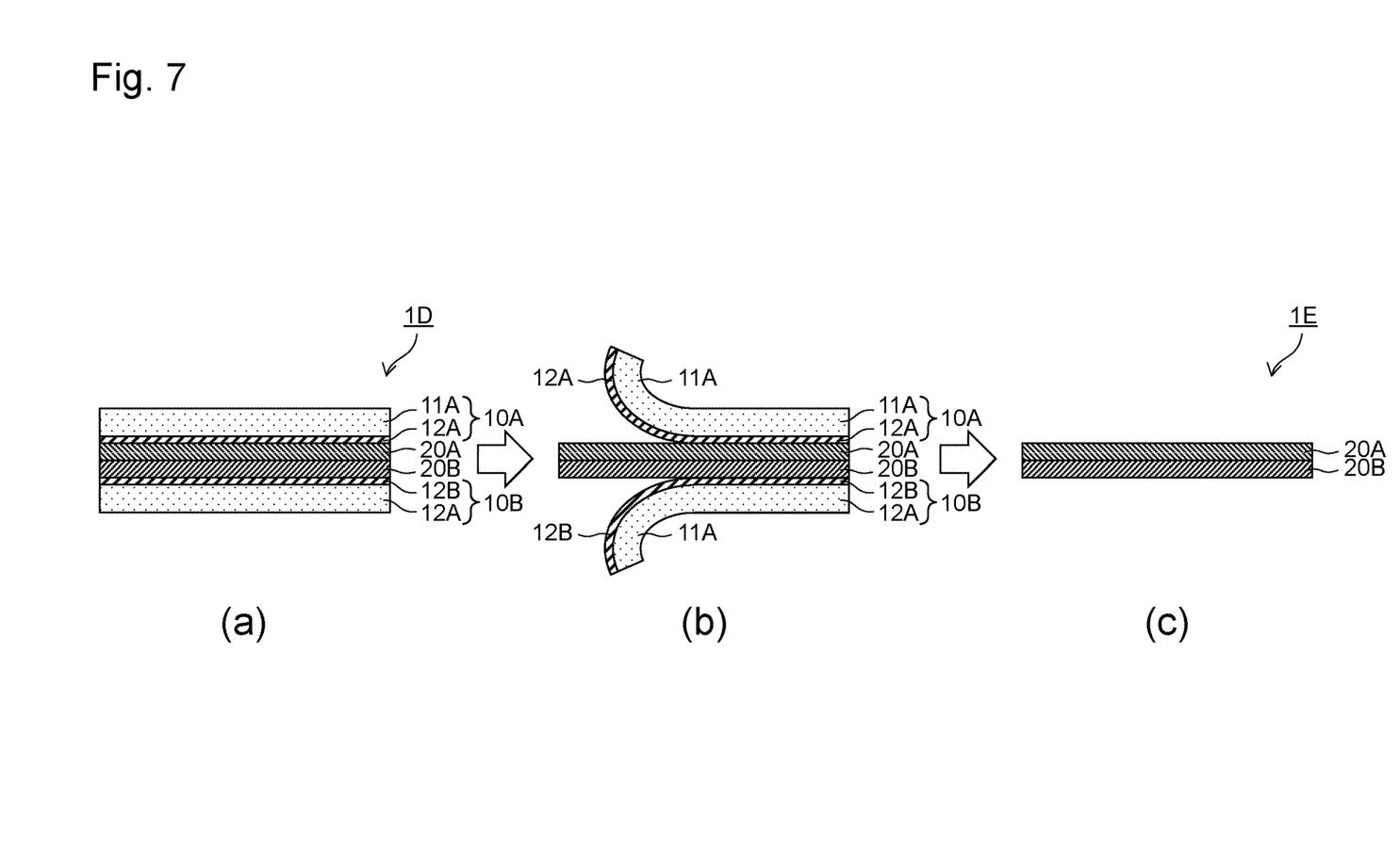
FIG. 7 is a view showing a production process of a roll-bonded laminate according to a fifth embodiment of the present invention.

Next, a method for producing a roll-bonded laminate according to a fifth embodiment of the present invention is described, following FIG. 7. A roll-bonded laminate 1E as shown in FIG. 5 is a roll-bonded laminate having a two-layer structure, in which a first ultrathin metal layer 20A having a thickness of 0.5 µm or more and 20 µm or less and a second ultrathin metal layer 20B having a thickness of 0.5 µm or more and 20 µm or less are laminated on each other. This roll-bonded laminate 1E can be obtained from the roll-bonded laminate 1D comprising a first carrier layer 10A and a second carrier layer 10B shown in FIG. 5. Specifically, as shown in FIG. 7, a roll-bonded laminate 1D is prepared (FIG. 7(a)), and the first carrier layer 10A and the second carrier layer 10B are peeled from this roll-bonded laminate 1D (FIG. 7(b)), so as to obtain the roll-bonded laminate 1E having a two-layer structure (FIG. 7(c)).

This roll-bonded laminate 1E is formed by lamination of two ultrathin metal layers with a thickness of 0.5 µm or more and 20 µm or less having excellent thickness accuracy. Utilizing its thinness, such a roll-bonded laminate 1E can be used as an ultrathin electromagnetic wave shielding material, a negative electrode current collector foil for secondary batteries, etc. In addition, when the ultrathin metal layer is copper, utilizing its high thermal conductivity and thinness, the roll-bonded laminate can be applied as a radiation performance member for electronics, a heat transport device, or a member thereof, and thereby, it is possible to achieve the high strength and space saving of the metal layer, while utilizing radiation performance. Furthermore, since it is possible to laminate ultrathin metal layers having excellent thickness accuracy, it is also possible to form a fine circuit according to a selective etching treatment. Thus, the roll-bonded laminate 1E can also be used as a fine electronic circuit.

EXAMPLES

Hereinafter, the present invention will be described in more detail in the following examples and comparative examples. However, these examples are not intended to limit the scope of the present invention.

Example 1

First, a laminate formed by establishing a copper layer with a thickness of 5 µm on a carrier layer body with a thickness of 18 µm consisting of electrolytic copper via an organic peel layer (carboxybenzotriazole (CBTA), etc.) with a thickness of approximately 50 nm used as a peel layer, and an aluminum foil (1N30) with a thickness of 50 µm, were prepared. The surface of the copper layer and the surface of the aluminum foil were roll-bonded to each other to produce a roll-bonded laminate of interest.

Before performing the roll-bonding, a sputter-etching treatment was performed on the surfaces of the copper layer and the aluminum foil, so that the surfaces were activated. The sputtering etching on the copper layer was carried out under conditions of 0.3 Pa, a plasma output of 400 W and for 5 minutes, whereas the sputter etching on the aluminum foil was carried out under conditions of 0.3 Pa, a plasma output of 400 W and for 5 minutes. The line load applied upon roll-bonding was set at 1.0 t/cm (333 MPa), and a rolling reduction caused by surface-activated bonding was 0% in both cases.

Example 2

A roll-bonded laminate was obtained in the same manner as that of the above-described Example 1, with the exception that a laminate consisting of a carrier layer and a copper layer, in which an inorganic peel layer (a nickel layer, a chromate layer, etc.) with a thickness of approximately 30 nm was used as a peel layer, was subjected to roll-bonding.

Comparative Example 1

A roll-bonded laminate was obtained in the same manner as that of the above-described Example 1, with the exception that the surface of a copper layer and the surface of an aluminum foil were roll-bonded to each other according to surface-activated bonding to produce the roll-bonded laminate, which was then subjected to a thermal treatment at 380° C. for 1 hour.

Comparative Example 2

A roll-bonded laminate was obtained in the same manner as that of the above-described Example 2, with the exception that the surface of a copper layer and the surface of an aluminum foil were roll-bonded to each other according to surface-activated bonding to produce the roll-bonded laminate, which was then subjected to a thermal treatment at 380° C. for 1 hour.

With regard to the roll-bonded laminates obtained in Examples 1 and 2 and Comparative Examples 1 and 2, the peel strength at the interface (cladding interface) between the copper layer and the aluminum foil, and the carrier peel strength between the carrier layer and the copper layer (the peel strength of the carrier layer) were measured. It is to be noted that, in the present examples and comparative examples, the term "peel strength" indicates a value measured using 180° peel strength (also referred to as "180° peeling strength"). A test piece with a width of 20 mm was produced from the roll-bonded laminate obtained in each of Examples 1 and 2 and Comparative Examples 1 and 2. First, in order to measure the carrier peel strength between the carrier layer and the ultrathin copper layer, the carrier layer and the ultrathin copper layer were partially peeled, and the carrier layer side or the ultrathin copper layer side was then fixed. Then, the other layer was pulled towards the side that was 180° opposite to the fixed side, and the power required to peel it off was measured. As a unit, N/20 mm was used. Subsequently, in order to measure peel strength at the interface between the ultrathin copper layer and the aluminum foil, the carrier layer was entirely peeled, and then, the ultrathin copper layer and the aluminum foil were partially peeled. In order to prevent the breakage of the ultrathin copper layer upon the measurement of the peel strength, a reinforcing tape was adhered to the ultrathin copper layer side. Thereafter, the ultrathin copper layer side, to which the above-described reinforcing tape had been adhered, or the aluminum foil side was fixed. Then, the other layer was pulled towards the side that was 180° opposite to the fixed side, and the power required to peel it off was measured. As a unit, N/20 mm was used. Moreover, generation of a blister in the peel layer was evaluated. The evaluation results are shown in Table 1.

As shown in Table 1, in the case of the roll-bonded laminates of Examples 1 and 2, the peel strength at the cladding interface was greater than the peel strength of the carrier layer, and the peel strength of the carrier layer was maintained at a low value of 0.1 N/20 mm or more and less than 1 N/20 mm. Thereby, only the carrier layer could be peeled from the ultrathin copper layer, and the carrier layer functioned as a protective layer and/or a support of the copper layer, so that an ultrathin copper layer having excellent thickness accuracy could be formed on the aluminum foil without generation of cracks or wrinkles on the ultrathin copper layer.

On the other hand, in the case of the roll-bonded laminate of Comparative Example 1, blisters were generated on the entire surface of the peel layer as a result of the thermal treatment. It was found that the adhesiveness of the carrier layer was weakened due to such blisters, that a phenomenon by which the carrier layer was unintentionally peeled from the copper layer was observed, and that the effects of the carrier layer as a protective layer and/or a support could not be obtained.

On the other hand, in the case of the roll-bonded laminate of Comparative Example 2, the adhesion strength at the interface between the carrier layer and the copper layer was increased by the thermal treatment, to such an extent that the two layers cannot be peeled from each other. It is assumed that this is because the carrier layer and the peel layer, and the ultrathin metal layer and the peel layer were each mutually diffused to form an alloy. Otherwise, it is also likely that the carrier layer and the ultrathin metal layer were mutually diffused via the peel layer, and thereby, the adhesion strength was excessively increased. Accordingly, it was not possible to obtain a roll-bonded laminate having a two-layer structure, in which the ultrathin copper layer was formed on the aluminum foil.

Example 3

First, a laminate formed by establishing a copper layer with a thickness of 5 μm on a carrier layer body with a thickness of 18 μm consisting of electrolytic copper via an organic peel layer (carboxybenzotriazole (CBTA), etc.) with a thickness of approximately 50 nm used as a peel layer, and a stainless steel foil (SUS316) with a thickness of 50 μm, were prepared. The surface of the copper layer and the surface of the stainless steel foil were roll-bonded to each other to produce a roll-bonded laminate of interest.

Before performing the roll-bonding, a sputter-etching treatment was performed on the surfaces of the copper layer and the stainless steel foil, so that the surfaces were activated. The sputtering etching on the copper layer was carried out under conditions of 0.3 Pa, a plasma output of 700 W and for 5 minutes, whereas the sputter etching on the stainless steel foil was carried out under conditions of 0.3 Pa, a plasma output of 700 W and for 20 minutes. The line load applied upon roll-bonding was set at 1.0 t/cm (333 MPa), and a rolling reduction caused by surface-activated bonding was 0% in both cases.

Example 4

A roll-bonded laminate was obtained in the same manner as that of the above-described Example 3, with the exception that a laminate consisting of a carrier layer and a copper layer, in which an inorganic peel layer (a nickel layer, a chromate layer, etc.) with a thickness of approximately 30 nm was used as a peel layer, was subjected to roll-bonding.

Comparative Example 3

A roll-bonded laminate was obtained in the same manner as that of the above-described Example 3, with the exception that the surface of a copper layer and the surface of a stainless steel foil were roll-bonded to each other according to surface-activated bonding to produce the roll-bonded laminate, which was then subjected to a thermal treatment at 380° C. for 1 hour.

Comparative Example 4

A roll-bonded laminate was obtained in the same manner as that of the above-described Example 4, with the exception that the surface of a copper layer and the surface of a stainless steel foil were roll-bonded to each other according

TABLE 1

| | | | Evaluation item | | |
|---|---|---|---|---|---|
| | | | | Peeling function | |
| | Type of peel layer | Heat treatment conditions | Peel strength at cladding interface | Generation of blisters | Peel strength of carrier layer |
| Ex. 1 | Organic | Non | 15N/20 mm | Not generated | 0.17N/20 mm or less |
| Ex. 2 | Inorganic | Non | Unmeasurable due to copper layer fracture | Not generated | 0.25N/20 mm or less |
| Comp. Ex. 1 | Organic | 380° C. | Unmeasurable due to copper layer fracture | Generated on entire surface | Laminated state cannot be maintained due to generation of blisters on entire surface |
| Comp. Ex. 2 | Inorganic | 380° C. | 25N/20 mm | Generated on partial surface | Non-peelable | to surface-activated bonding to produce the roll-bonded laminate, which was then subjected to a thermal treatment at 380° C. for 1 hour.

With regard to the roll-bonded laminates obtained in Examples 3 and 4 and Comparative Examples 3 and 4, the peel strength at the interface (cladding interface) between the copper layer and the stainless steel foil, and the carrier peel strength between the carrier layer and the copper layer (the peel strength of the carrier layer) were measured. Moreover, generation of a blister in the peel layer was evaluated. The evaluation results are shown in Table 2.

As shown in Table 2, in the case of the roll-bonded laminates of Examples 3 and 4, the peel strength at the cladding interface was greater than the peel strength of the carrier layer, and the peel strengths of the carrier layers were both maintained at a low value of less than 1 N/20 mm, specifically, approximately 0.1 N/20 mm to 0.25 N/20 mm. Thereby, only the carrier layer could be peeled from the ultrathin copper layer, and the carrier layer functioned as a protective layer and/or a support of the copper layer, so that an ultrathin copper layer having excellent thickness accuracy could be formed on the stainless steel foil without generation of cracks or wrinkles on the ultrathin copper layer.

On the other hand, in the case of the roll-bonded laminate of Comparative Example 3, blisters were generated on the entire surface of the peel layer as a result of the thermal treatment. It was found that the adhesiveness of the carrier layer was weakened due to such blisters, that a phenomenon by which the carrier layer was unintentionally peeled from the copper layer was observed, and that the effects of the carrier layer as a protective layer and/or a support could not be obtained.

On the other hand, in the case of the roll-bonded laminate of Comparative Example 4, blisters were partially generated in the peel layer, and the adhesiveness of the carrier layer became weak.

Example 5

First, a laminate formed by establishing a copper layer with a thickness of 5 μm on a carrier layer body with a thickness of 18 μm consisting of electrolytic copper via an inorganic peel layer (a nickel layer, a chromate layer, etc.) with a thickness of approximately 30 nm used as a peel layer, and a stainless steel foil (SUS304) with a thickness of 15 μm, were prepared. The surface of the copper layer and the surface of the stainless steel foil were roll-bonded to each other to produce a roll-bonded laminate of interest.

Before performing the roll-bonding, a sputter-etching treatment was performed on the surfaces of the copper layer and the stainless steel foil, so that the surfaces were activated. The sputtering etching on the copper layer was carried out under conditions of 0.3 Pa, a plasma output of 700 W and for 10 minutes, whereas the sputter etching on the stainless steel foil was carried out under conditions of 0.3 Pa, a plasma output of 700 W and for 20 minutes. The line load applied upon roll-bonding was set at 0.5 t/cm (167 MPa), and a rolling reduction caused by surface-activated bonding was 0% in both cases.

With regard to the roll-bonded laminate obtained in Example 5, the peel strength at the interface (cladding interface) between the copper layer and the stainless steel foil, and the carrier peel strength between the carrier layer and the copper layer (the peel strength of the carrier layer) were measured. Moreover, generation of a blister in the peel layer was evaluated. The evaluation results are shown in Table 3.

As shown in Table 3, in the case of the roll-bonded laminate of Example 5, the peel strength at the cladding interface was greater than the peel strength of the carrier layer, and the peel strength of the carrier layer was maintained at a low value of 0.1 N/20 mm or less. Thereby, only the carrier layer could be peeled from the ultrathin copper layer, and the carrier layer functioned as a protective layer and/or a support of the copper layer, so that an ultrathin copper layer having excellent thickness accuracy could be formed on the stainless steel foil without generation of cracks or wrinkles on the ultrathin copper layer.

TABLE 2

| | | | | Evaluation item | | |
|---|---|---|---|---|---|---|
| | | | | | Peeling function | |
| | Type of peel layer | Heat treatment conditions | Peel strength at cladding interface | Generation of blisters | Peel strength of carrier layer | |
| Ex. 3 | Organic | Non | Unmeasurable due to Cu fracture | Not generated | 0.25N/20 mm or less | |
| Ex. 4 | Inorganic | Non | Unmeasurable due to Cu fracture | Not generated | 0.1N/20 mm or less | |
| Comp. Ex. 3 | Organic | 380° C. | Unmeasurable due to Cu fracture | Generated on entire surface | Laminated state cannot be maintained due to generation of blisters on entire surface | |
| Comp. Ex. 4 | Inorganic | 380° C. | Unmeasurable due to Cu fracture | Generated on partial surface | 4.3N/20 mm | |

TABLE 3

| | | | Evaluation item | | |
| --- | --- | --- | --- | --- | --- |
| | | | | Peeling function | |
| | Type of peel layer | Heat treatment conditions | Peel strength at cladding interface | Generation of blisters | Peel strength of carrier layer |
| Ex. 5 | Inorganic | Non | Unmeasurable due to Cu fracture | Not generated | 0.1N/20 mm or less |

REFERENCE SIGNS LIST 1A, 1B, 1C, 1D, 1E Roll-bonded laminate
2 Laminate
10 Carrier layer
10A First carrier layer
10B Second carrier layer
11 Carrier layer body
11A First carrier layer body
11B Second carrier layer body
12 Peel layer
12A First peel layer
12B Second peel layer
20 Ultrathin metal layer
20A First ultrathin metal layer
20B Second ultrathin metal layer
20a Surface of ultrathin metal layer
20Aa Surface of first ultrathin metal layer
20Ba Surface of second ultrathin metal layer
30 Metallic foil
30a Surface of metallic foil
40 Intermediate layer All publications, patents and patent applications cited in the present description are incorporated herein by reference in their entirety.

The invention claimed is:

1. A roll-bonded laminate formed by lamination of at least three layers, wherein:
   the roll-bonded laminate comprises a peelable carrier layer, an ultrathin metal layer, and a metallic foil, in this order;
   the peelable carrier layer comprises a carrier layer body and a peel layer, and the peelable carrier layer is laminated with the ultrathin metal layer via the peel layer;
   the thickness of the ultrathin metal layer is 0.5 μm or more and 20 μm or less; and
   a peel strength between the carrier layer and the ultrathin metal layer is in the range of 0.1 N/20 mm or more and less than 1 N/20 mm.

2. The roll-bonded laminate according to claim 1, which has one or more intermediate layers comprising metal between the ultrathin metal layer and the metallic foil.

3. The roll-bonded laminate according to claim 1, wherein the peel strength between the ultrathin metal layer and the metallic foil is greater than the carrier peel strength between the carrier layer and the ultrathin metal layer.

4. The roll-bonded laminate according to claim 1, wherein the ultrathin metal layer is a layer of metal selected from the group consisting of copper, iron, nickel, zinc, tin, chromium, gold, silver, platinum, cobalt, titanium, and an alloy comprising any of these metals as a base.

5. The roll-bonded laminate according to claim 1, wherein the metallic foil is a foil of metal selected from the group consisting of aluminum, iron, copper, nickel, magnesium, silver, gold, platinum, and an alloy comprising any of these metals as a base.

6. A method for producing a roll-bonded laminate, in which the roll-bonded laminate is formed by lamination of at least two layers and comprises an ultrathin metal layer and a metallic foil, and the thickness of the ultrathin metal layer is 0.5 μm or more and 20 μm or less, wherein the method comprises a step of peeling a carrier layer from the roll-bonded laminate according to claim 1.

7. A roll-bonded laminate consisting of:
   an ultrathin metal layer as a single layer made by a wet film formation method or a dry film formation method; and
   a metallic foil as a single layer, wherein:
   the ultrathin metal layer and the metallic foil are laminated on each other by roll bonding;
   the ultrathin metal layer is a copper layer having a thickness of 0.5 μm or more and 20 μm or less;
   the metallic foil is a foil of metal selected from the group consisting of aluminum, iron, copper, nickel, magnesium, silver, gold, platinum, and an alloy comprising any of these metals as a base; and
   the standard deviation σ of the thickness of the ultrathin metal layer is less than 1 μm.

8. The roll-bonded laminate of claim 7, wherein the ultrathin metal layer is a copper layer having a thickness of 1 μm or more and 7 μm or less.

* * * * *